(12) United States Patent
Gundert et al.

(10) Patent No.: US 7,759,445 B2
(45) Date of Patent: Jul. 20, 2010

(54) PROCESS FOR PREPARING 1-OLEFIN (CO) POLYMERS

(75) Inventors: Friedhelm Gundert, Liederbach (DE); Maria Schmitt (nee Fusto), Kraichtal-Gochsheim (DE); Martin Schneider, Kelkheim (DE)

(73) Assignee: Basell Polyolefine GmbH, Wesseling (DE)

( * ) Notice: Subject to any disclaimer, the term of this patent is extended or adjusted under 35 U.S.C. 154(b) by 207 days.

(21) Appl. No.: 11/884,505

(22) PCT Filed: Feb. 15, 2006

(86) PCT No.: PCT/EP2006/001343

§ 371 (c)(1),
(2), (4) Date: Aug. 16, 2007

(87) PCT Pub. No.: WO2006/087170

PCT Pub. Date: Aug. 24, 2006

(65) Prior Publication Data

US 2008/0161516 A1    Jul. 3, 2008

Related U.S. Application Data

(60) Provisional application No. 60/662,222, filed on Mar. 15, 2005.

(51) Int. Cl.
*C08F 110/02*  (2006.01)

(52) U.S. Cl. ............... 526/352; 526/124.2; 526/124.3; 526/348.1; 502/103; 502/115; 502/125

(58) Field of Classification Search ............ 526/124.2, 526/124.3, 348.1, 352; 502/103, 115, 125
See application file for complete search history.

(56) References Cited

U.S. PATENT DOCUMENTS

| 4,447,587 A | * | 5/1984 | Berthold et al. .......... 526/124.2 |
| 5,556,820 A | | 9/1996 | Funabashi et al. |
| 5,648,309 A | | 7/1997 | Böhm |
| 7,008,898 B1 | | 3/2006 | Alt et al. |

FOREIGN PATENT DOCUMENTS

| DE | 1795197 | 5/1972 |
| EP | 68257 | 1/1983 |
| EP | 401776 | 12/1990 |
| WO | 01/38405 | 5/2001 |

\* cited by examiner

*Primary Examiner*—Ling-Siu Choi
(74) *Attorney, Agent, or Firm*—Jarrod N. Raphael

(57) ABSTRACT

For the (co) polymerization of ethylene with other 1-olefins, a Ziegler catalyst which comprises the product from the reaction of a magnesium alkoxide suspended or dispersed as ge in an inert solvent with a tetravalent transition metal compound and is subjected to a thermal after-treatment for a period of not more than 180 minutes is prepared. The catalyst gives a high yield of a polymer powder which has a broad molar mass distribution and is best suited to the production of films, hollow bodies and pipes.

14 Claims, No Drawings

PROCESS FOR PREPARING 1-OLEFIN (CO) POLYMERS

The invention relates to a process for the (co)polymerization of 1-olefins to form polymer powder in the presence of catalyst systems of the Ziegler-Natta type which comprise a component A which is obtained by reaction of magnesium alkoxide with a titanium compound and an after-treatment of the reaction product and an organometallic compound of groups I-III of the Periodic Table as component B.

Processes for preparing polyolefins by means of catalysts formed by reaction of magnesium alkoxides with transition metal halides are known (DE-B 1 795 197). In this case, a temperature range from 0 to 200° C. is recommended for the reaction, but the upper temperature limit should be selected so that no decomposition products are formed. Advantages are said to be not only the high activity of the polymerization catalysts but also, in particular, the possibility of preparing ethylene homopolymers and ethylene-α-olefin copolymers having a narrow molecular weight distribution.

EP-A 068 257 discloses a process for preparing Ziegler catalysts which are obtained from the reaction product of magnesium alkoxide with titanium tetrachloride as component A and an organometallic compound as component B. To prepare the component A, the magnesium alkoxide is reacted with the titanium tetrachloride in a first reaction step at temperatures in the range from 50 to 100° C. The reaction product is then after-treated thermally in a second reaction step at an elevated temperature in the range from 110 to 200° C. until no further elimination of alkyl chloride occurs. The polymers prepared using these catalysts have a broad molecular weight distribution.

EP-A 401 776 discloses a process for preparing a Ziegler catalyst in which the reaction product of magnesium alkoxide and titanium tetrachloride is firstly washed a number of times and then after-treated thermally for a period of 18 hours. These catalysts, too, give polymers having a broad molecular weight distribution.

The known processes are time-consuming and require large amounts of energy, which under the pressures of scarce resources leads to competitive disadvantages and to more expensive end products. In addition, the known catalysts still leave something to be desired in respect of their polymerization activities.

It was an object of the invention to find a simple process for preparing Ziegler catalysts which make it possible to prepare polymers in high yields. These polymers should have a medium to broad molar mass distribution, expressed as $M_w/M_n$, of greater than 6.9 even in a single-stage polymerization process. This property makes these catalysts suitable for preparing polymer products having an excellent balance between processing behavior and final properties in a single-stage or multistage process. An example which may be mentioned is the preparation of polymer material which can be processed by film blowing with good parison stability to give films having particularly good mechanical properties, e.g. the dart drop value in accordance with ASTM D 1709.

This object is achieved by a process in which the component A is formed by allowing magnesium alkoxide to react with a transition metal compound, in particular a titanium compound, in a suspension medium and then subjecting the reaction product without further intermediate steps to a thermal after-treatment for a period of not more than 120 minutes.

The invention accordingly provides a process for preparing an olefin polymer by (co)polymerization of ethylene or of ethylene with up to 10% by weight, based on the total amount of monomers, of a 1-olefin of the formula $R—CH=CH_2$, where R is a straight-chain or branched alkyl radical having from 1 to 12 carbon atoms, in suspension, in solution or in the gas phase, at a temperature of from 20 to 120° C., and a pressure of from 0.2 to 6.0 MPa in the presence of a catalyst comprising the reaction product of a magnesium alkoxide with a tetravalent titanium compound, wherein a magnesium alkoxide of the formula I $$Mg(OR^1)(OR^2) \tag{I}$$

where $R^1$ and $R^2$ are identical and are each an unbranched or branched alkyl radical having from 1 to 20 carbon atoms or a radical $(CH_2)_nOR^3$, where $R^3$ is an alkyl radical having from 1 to 4 carbon atoms and n is an integer from 2 to 6, is initially charged in a suspension medium and reacted with a tetravalent transition metal compound of the formula II $$M^1X_m(OR^4)_{4-m} \tag{II}$$

where $M^1$ is titanium, zirconium or hafnium, $R^4$ is an alkyl radical having from 1 to 9 carbon atoms and X is a halogen atom and m is an integer from zero to 4, at a temperature in the range from 20 to 140° C. and the reaction product is then after-treated thermally at a temperature in the range from 90 to 200° C. for a period of from 10 to 180 minutes.

The preparation of the mixed catalyst component to be used according to the invention is carried out using a magnesium alkoxide of the formula (I)

$$Mg(OR^1)(OR^2) \tag{I}$$

In this formula, $R^1$ and $R^2$ are identical or different and are each an unbranched or branched alkyl radical which preferably has from 2 to 10 carbon atoms or a radical $—(CH_2)_nOR^6$, where $R^6$ is a $C_1$-$C_4$-alkyl radical, preferably a $C_1$-$C_2$-alkyl radical, and n is an integer from 2 to 6.

Examples of such magnesium alkoxides are
magnesium dimethoxide,
magnesium diethoxide,
magnesium di-i-propoxide,
magnesium di-n-propoxide,
magnesium di-n-butoxide,
magnesium methoxide ethoxide,
magnesium ethoxide n-propoxide,
magnesium di(2-methyl-1-pentoxide),
magnesium di(2-methyl-1-hexoxide),
magnesium di(2-methyl-1-heptoxide),
magnesium di(2-ethyl-1-pentoxide),
magnesium di(2-ethyl-1-hexoxide),
magnesium di(2-ethyl-1-heptoxide),
magnesium di(2-propyl-1-heptoxide),
magnesium di(2-methoxy-1-ethoxide),
magnesium di(3-methoxy-1-propoxide),
magnesium di(4-methoxy-1-butoxide),
magnesium di(6-methoxy-1-hexoxide),
magnesium di(2-ethoxy-1-ethoxide),
magnesium di(3-ethoxy-1-propoxide),
magnesium di(4-ethoxy-1-butoxide),
magnesium di(6-ethoxy-1-hexoxide),
magnesium dipentoxide,
magnesium dihexoxide.

Preference is given to using the simple magnesium alkoxides such as magnesium diethoxide, magnesium di-n-propoxide and magnesium di-i-butoxide.

The magnesium alkoxide is used as a suspension or as a gel dispersion.

The magnesium alkoxide is firstly reacted with a tetravalent transition metal compound of the formula II $$M^1X_m(OR^3)_{4-m} \tag{II}$$

where $M^1$ is titanium, zirconium or hafnium, preferably titanium or zirconium, $R^3$ is an alkyl radical having from 1 to 9, preferably from 1 to 4 carbon atoms and X is a halogen atom, preferably chlorine, and m is from zero to 4, preferably from 2 to 4.

Examples which may be mentioned are:
$TiCl_4$, $TiCl_3(OC_2H_5)$, $TiCl_2(OC_2H_5)_2$, $TiCl(OC_2H_5)_3$, $Ti(OC_2H_5)_4$, $TiCl_3(OC_3H_7)$, $TiCl_2(OC_3H_7)_2$, $TiCl(OC_3H_7)_3$, $Ti(OC_3H_7)_4$, $TiCl_3(OC_4H_9)$, $TiCl_2(OC_4H_9)_2$, $TiCl(OC_4H_9)_3$, $Ti(OC_4H_9)_4$, $TiCl_3(OC_6H_{13})$, $TiCl_2(OC_6H_{13})_2$, $TiCl(OC_6H_{13})_3$, $Ti(OC_6H_{13})_4$, $Ti(OC_9H_{19})_4$, $TiBr_4$, $TiBr_3(OR^3)$, $TiBr_2(OR^3)_2$, $TiBr(OR^3)_3$, $TiI_4$, $TiI_3(OR^3)$, $TiI_2(OR^3)_2$, $TiI(OR^3)_3$, $ZrCl_4$, $ZrBr_4$, $ZrI_4$, $Zr(OC_2H_5)_4$, $Zr(OC_3H_7)_4$, $Zr(OC_4H_9)_4$, $ZrCl_2(OC_3H_7)_2$; preference is given to using $TiCl_4$, $ZrCl_4$, $Ti(OC_2H_5)_4$, $Ti(OC_3H_7)_4$, $Zr(OC_3H_7)_4$, $Ti(OC_4H_9)_4$ and $Zr(OC_4H_9)_4$. Particular preference is given to $TiCl_4$.

The reaction of the magnesium alkoxide with the tetravalent transition metal compounds is carried out at a temperature at from 20 to 140° C., preferably from 60 to 90° C., over a period of from 1 to 20 hours.

Suitable inert suspension media for the abovementioned reactions include aliphatic and cycloaliphatic hydrocarbons such as butane, pentane, hexane, heptane, cyclohexane, isooctane and also aromatic hydrocarbons such as benzene and xylene. Petroleum spirit and hydrogenated diesel oil fractions which have carefully been freed of oxygen, sulfur compounds and moisture can also be used.

The magnesium alkoxide and the tetravalent transition metal compound ($M^1$) are reacted in a molar ratio of $Mg:M^1$ of 1:0.05-10, preferably 1:0.1-3.5.

Subsequent to the reaction, the suspension of the solid is stirred at from 90 to 200° C., preferably from 100 to 140° C., for from 20 to 180 minutes, preferably from 30 to 90 minutes, and then washed until the supernatant mother liquor has Cl and Ti (Zr,Hf) concentrations of less than 10 mmol/l.

As catalyst component B, use is made of a trialkylaluminum having from 1 to 6 carbon atoms in the alkyl radical, e.g. triethylaluminum, triisobutylaluminum, triisohexylaluminum, or the reaction product of a trialkylaluminum or dialkylaluminum hydride with isoprene known as isoprenylaluminum. Preference is given to triethylaluminum and triisobutylaluminum.

The mixing of the component A and the component B can be carried out in a stirred vessel at a temperature of from −30° C. to 150° C. prior to the polymerization. It is also possible to combine the two components directly in the polymerization vessel at a polymerization temperature of from 20° C. to 200° C. However, the addition of the component B can also be carried out in two steps by preactivating the component A with part of the component B at a temperature of from −30° C. to 150° C. prior to the polymerization reaction and adding the remainder of the component B in the polymerization reactor at a temperature of from 20° C. to 200° C.

It is also possible firstly to prepolymerize the catalyst system with α-olefins, preferably linear $C_2$-$C_{10}$-1-alkenes and in particular ethylene or propylene, and then to use the resulting prepolymerized catalyst solid in the actual polymerization. The mass ratio of catalyst solid used in the prepolymerization to monomer polymerized onto it is usually in the range from 1:0.1 to 1:20.

It is also possible to isolate the catalyst in the unprepolymerized form or in the prepolymerized form and store it as a solid and resuspend it on later use.

The polymerization is carried out in one or more stages, preferably as a suspension polymerization, in an inert suspension medium. Suitable suspension media are the same organic solvents as have been described for the preparation of the catalyst component A. However, polymerization in the gas phase is also possible.

The polymerization temperature is from 20 to 120° C., preferably from 70 to 90° C., and the pressure is in the range from 0.2 to 6.0 MPa, preferably from 0.4 to 2.0 MPa.

If the reaction is carried out in two stages, the ratio of the polyolefins of differing molar mass formed in the stages 1 and 2 is in the range from 30:70 to 70:30.

The catalyst system used according to the invention is employed to polymerize ethylene or ethylene with up to 10% by weight, based on the total amount of monomers, of a 1-olefin of the formula $R^7$—CH=$CH_2$, where $R^7$ is a straight-chain or branched alkyl radical having from 1 to 12, preferably from 1 to 10, carbon atoms. Examples are propylen, 1-butene, 1-pentene, 1-hexene, 1-octene, 4-methyl-1-pentene. Preference is given to using propylene, 1-butene and 1-hexene. The comonomer is preferably introduced in the second stage in which a polymer having the higher molar mass is formed.

The total polymer after the second stage is separated off from the dispersion medium and dried in a known manner.

Characteristics of the catalyst component A are a reduced time requirement compared to the prior art and a significantly reduced energy consumption. In addition, a further increase in the polymerization activity of the catalyst to a high level is astonishingly found. This was particularly surprising because the known Ziegler catalysts are themselves known for a high polymerization activity.

The particle size distribution of the polymer is very uniform.

The molar mass of the polyolefins is regulated efficiently by means of hydrogen in the presence of the catalyst used according to the invention.

The invention is illustrated for a person skilled in the art by means of the examples described below.

The results for the elemental composition of the catalysts described reported in the examples were obtained by the following analytical methods:

Ti: photometrically via the peroxide complex

Mg, Cl: titrimetrically by customary methods

The product properties of the polymer powders reported in the tables were determined by the following methods:

$MFR_{5/190}$: mass flow rate (melt index) in accordance with ISO1133, nominal load=5 kg and test temperature=190° C.

$FRR_{21.6/5}$: flow rate ratio; quotient of $MFR_{21.6/190}$ and $MFR_{5/190}$

VN (viscosity number): in accordance with DIN EN ISO 1628-3

Bulk density: in accordance with DIN EN ISO 60

$d_{50}$ (mean particle diameter): in accordance with DIN 53477 and DIN66144

$M_w/M_n$ (polydispersity): Measure of the width of the molar mass distribution ($M_w$=weight average, $M_n$=number average), determined by the GPC method in accordance with DIN55672. The measurements were carried out at 135° C. using trichlorobenzene as solvent.

EXAMPLE 1

According to the Invention a) Preparation of the Catalyst Component A:

In a 1 $dm^3$ four-neck flask provided with reflux condenser, stirrer and inert gas blanketing (Ar), 57 g (0.5 mol) of $Mg(OC_2H_5)_2$ were suspended in 0.5 $dm^3$ of diesel oil having a boiling range from 140 to 170° C. (hydrogenated petroleum fraction). 237 g (1.25 mol) of $TiCl_4$ were then added dropwise at 85° C. over a period of 5 hours. After an after-reaction time of 0.5 hour, the suspension was heated at 135° C. for 1 hour. It was then cooled to 60-70° C. and, after the solid had settled, the supernatant liquid phase (mother liquor) was taken off. The solid was subsequently resuspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated until the titanium concentration of the mother liquor was then less than 10 mmol/dm³.

The suspension was cooled to room temperature. The molar ratio of the solid (=catalyst component A) was:

Mg:Ti:Cl≈1:0.26:2.32.

b) Ethylene Polymerization in Suspension:

800 cm³ of diesel oil (hydrogenated petroleum fraction having a boiling range from 140 to 170° C.) were placed in a 1.5 dm³ reactor. The reactor was then heated to 85° C. and, under a blanket of nitrogen, 2 mmol of triethylaluminum as cocatalyst (=catalyst component B) and subsequently the catalyst component A prepared as described in Example 1a in an amount corresponding to 0.05 mmol of titanium, as a suspension diluted with diesel oil, were introduced into the reactor. The reactor was then pressurized with 3.15 bar of hydrogen and 3.85 bar of ethylene. The total pressure of 7 bar was kept constant during the polymerization time of 2 hours by replacing the ethylene which had been consumed. The polymerization was stopped by shutting off the ethylene feed and venting of the gases. The polymer powder was separated off from the dispersion medium by filtration and drying.

The results of the polymerization are shown below in Table 1.

EXAMPLE 2

According to the Invention

The preparation of the catalyst component A was carried out as described in Example 1 except that the mixture was heated at 120° C. for 1 hour after the addition of $TiCl_4$.

After washing was complete, the suspension was cooled to room temperature. The molar ratio of the solid (=catalyst component A) was: Mg:Ti:Cl≈1:0.18:2.29.

The ethylene polymerization in suspension was carried out as described in Example 1b). The results of the polymerization are listed below in Table 1.

EXAMPLE 3

According to the Invention a) Preparation of the Catalyst Component A:

In a 1 dm³ four-neck flask provided with reflux condenser, stirrer and inert gas blanketing (Ar), 57 g (0.5 mol) of $Mg(OC_2H_5)_2$ were suspended in 0.5 dm³ of diesel oil having a boiling range from 140 to 170° C. (hydrogenated petroleum fraction). 190 g (1 mol) of $TiCl_4$ were then added dropwise at 85° C. over a period of 5 hours. After an after-reaction time of 0.5 hour, the suspension was heated at 120° C. for 1 hour. It was then cooled to 60-70° C. and, after the solid had settled, the supernatant liquid phase (mother liquor) was taken off. The solid was subsequently resuspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated until the titanium concentration of the mother liquor was then 10 mmol/dm³. After the washing step was concluded, the suspension was cooled to room temperature. The molar ratio of the solid was:

Mg:Ti:Cl≈1:0.14:2.28.

b) Ethylene Polymerization in Suspension:

The polymerization is carried out as described in Example 1b), except that the catalyst component A prepared as described in Example 3a was introduced into the reactor in an amount corresponding to 0.03 mmol of titanium as a suspension diluted with diesel oil. The results of the polymerization are shown below in Table 1.

COMPARATIVE EXAMPLE 1

The preparation of the catalyst component A was carried out by the method described in Example 2, except that the mixture was heated at 120° C. for 4 hours.

The suspension was then cooled to room temperature. The molar ratio of the solid was: Mg:Ti:Cl≈1:0.44:2.54.

The polymerization is carried out as described in Example 1, except that the catalyst component A prepared as described in Comparative Example 1 was introduced into the reactor in an amount corresponding to 0.04 mmol of titanium as a suspension diluted with diesel oil. The results of the polymerization are shown below in Table 1.

COMPARATIVE EXAMPLE 2

In a 1 dm³ four-neck flask provided with reflux condenser, stirrer and inert gas blanketing (Ar), 57 g (0.5 mol) of $Mg(OC_2H_5)_2$ were suspended in 0.5 dm³ of diesel oil having a boiling range from 140 to 170° C. (hydrogenated petroleum fraction). 161 g (0.85 mol) of $TiCl_4$ were then added dropwise at 85° C. over a period of 4 hours. After an after-reaction time of 0.5 hour, the reaction mixture was cooled to 60-70° C. and, after the solid had settled, the supernatant liquid phase (mother liquor) was taken off. The solid was subsequently resuspended in fresh diesel oil (hydrogenated petroleum fraction having a boiling range from 140 to 170° C.) and after a stirring time of 15 minutes and subsequent complete settling of the solid, the supernatant liquid phase was taken off again. This washing procedure was repeated until the titanium concentration of the mother liquor was 40-50 mmol/dm³. The suspension was subsequently heated at 120° C. for 18 hours.

The suspension was then cooled to room temperature. The molar ratio of the solid was: Mg:Ti:Cl≈1:0.32:2.22.

The polymerization is carried out as described in Example 1, except that the catalyst component A prepared as described in Comparative Example 2 was introduced into the reactor in an amount corresponding to 0.1 mmol of titanium as a suspension diluted with diesel oil. The results of the polymerization are shown below in Table 1.

TABLE 1

Polymerization experiments in 1.5 dm³ reactor, 2 mmol of triethylaluminum, 0.8 dm³ of diesel oil, polymerization temperature: 85° C., 3.15 bar of H₂, 3.85 bar of C₂ (total pressure: 7 bar), polymerization time: 2 h

| Catalyst component A from | Ex. 1 | Ex. 2 | Ex. 3 | Comp. Ex. 1 | Comp. Ex. 2 |
|---|---|---|---|---|---|
| Polymerization activity [kg of PE/mmol of titanium] | 3.0 | 4.4 | 7.4 | 1.8 | 2.2 |
| Bulk density in [g/dm³] | 391 | 375 | 349 | 320 | 375 |
| $d_{50}$ in [µm] | 119 | 154 | 184 | 114 | 175 |
| VN in [cm³/g] | 176 | 151 | 203 | 211 | 141 |
| $MFR_{5/190}$ in [g/10 min] | 9.9 | 10.5 | 7.3 | 4.6 | 30.9 |
| $FRR_{21,6/5}$ | 11.5 | 11.2 | 10.3 | 10.2 | 11.5 |
| $M_w$ in [g/mol] | $1.4 \cdot 10^5$ | $1.3 \cdot 10^5$ | $1.4 \cdot 10^5$ | $1.6 \cdot 10^5$ | $0.96 \cdot 10^5$ |
| $M_w/M_n$ | 8.0 | 7.2 | 7.4 | 6.1 | 7.2 |

It can clearly be seen from the values in Table 1 that polymers having a broad molar mass distribution can be prepared advantageously at a higher polymerization activity by the process of the invention.

EXAMPLE 4

According to the Invention a) Preparation of the Catalyst Component A:

In a 130 l reactor equipped with an impeller stirrer and baffles, 4.5 kg (=39 mol) of Mg(OC₂H₅)₂ were suspended in 59 dm³ of diesel oil having a boiling range from 140 to 170° C. (hydrogenated petroleum fraction). 18.7 kg (=98 mol) of TiCl₄ were then added at 85° C. over a period of 5 hours. After an after-reaction time of 0.5 hour, the mixture was heated at T=120° C. for 1 hour. 35 dm³ of diesel oil having a boiling range from 140 to 170° C. (hydrogenated petroleum fraction) were then added and the mixture was cooled to T=70° C. After the solid had settled, the supernatant liquid phase (mother liquor) was then decanted off to a residual volume of 50 dm³. 55 dm³ of fresh diesel oil (hydrogenated petroleum fraction having a boiling range from 140 to 170° C.) were subsequently introduced. After a stirring time of 20 minutes, the supernatant liquid was again decanted off to a residual volume of 50 dm³. This washing procedure was repeated until the titanium concentration of the mother liquor was less than 10 mmol/dm³.

The suspension was then cooled to room temperature. The molar ratio of the solid (=catalyst component A) was:

Mg:Ti:Cl≈1:0.14:2.30.

b) Ethylene Polymerization in Suspension:

The polymerization experiments were carried out batchwise in a 200 dm³ reactor. This reactor was equipped with an impeller stirrer and baffles. The temperature in the reactor was measured and automatically kept constant. The polymerization temperature was 85±1° C.

The polymerization reaction was carried out in the following way: 100 dm³ of diesel oil (hydrogenated petroleum fraction having a boiling range from 140 to 170° C.) were placed in the N₂-blanketed reactor and heated to 85° C. Under a blanket of inert gas (N₂), 60 mmol of triethylaluminum were added as cocatalyst (=catalyst component B) and the catalyst component A prepared as described in Example 4a was subsequently introduced into the reactor in an amount corresponding to 3.0 mmol of titanium as a suspension diluted with diesel oil. The molar aluminum/titanium ratio was thus 20:1.

The reactor was pressurized a number of times with H₂ (hydrogen) to 8 bar and depressurized again to remove the nitrogen completely from the reactor (the procedure was monitored by measurement of the H₂ concentration in the gas space of the reactor, which finally indicated 95% by volume). The polymerization was started by opening the ethylene inlet. Ethylene was introduced in an amount of 8.0 kg/h over the entire polymerization time, with the pressure in the reactor rising slowly. The concentration of hydrogen in the gas space of the reactor was measured continually and the proportion by volume was kept constant by introducing appropriate amounts of hydrogen (% by volume of H₂=50-55).

The polymerization was stopped after 225 minutes (total of 30 kg of ethylene gas fed in) and the total pressure was read off. The contents of the reactor were drained onto a filter. The polymer which was moist with diesel oil was dried in a stream of nitrogen over a period of several hours.

The results of the polymerizations are shown in Table 2.

EXAMPLE 5

According to the Invention

In a 1 dm³ four-neck flask provided with reflux condenser, stirrer and inert gas blanketing (Ar), 500 cm³ of the suspension of the catalyst component A prepared as described in Example 4a, which had a concentration of 0.09 mol/l based on titanium, were admixed with 6.2 ml of triethylaluminum. The mixture was stirred at 120° C. for 2 hours. 100% of the titanium(IV) was reduced to titanium(III) by means of this preactivation process.

The polymerization of ethylene over the preactivated catalyst component A was carried out by a method analogous to that described in Example 4b).

The results of the polymerizations are listed in Table 2.

EXAMPLE 6

According to the Invention a) Preparation of the Catalyst Component A as Dry Catalyst:

The suspension prepared by the method described in Example 4a was diluted with 25 dm³ of diesel oil (hydrogenated petroleum fraction having a boiling range from 140 to 170° C.). It was then heated to T=65° C. and 150 mmol of triethylaluminum were added. While stirring, the reactor was flushed three times with 2 bar of hydrogen and then pressurized with 3 bar of hydrogen. A total of 5.3 kg of ethylene were subsequently metered in at a rate of 0.5 kg/h.

After cooling to room temperature, a sample of 0.5 dm³ was taken from this prepolymerized catalyst suspension. Under a blanket of inert gas (Ar), the solid was allowed to settle and the supernatant diesel oil was then decanted off and the solid was washed twice with hexane. The solid was then dried at 80° C. under reduced pressure on a rotary evaporator. This concluded the preparation of the prepolymerized catalyst component A as dry catalyst.

The polymerization of ethylene over the prepolymerized catalyst component A was carried out by a method analogous to that described in Example 4b). For this purpose, the dry catalyst described in Example 6a was resuspended in diesel oil (hydrogenated petroleum fraction having a boiling range from 140 to 170° C.).

The results of the polymerizations are listed in Table 2.

COMPARATIVE EXAMPLE 3

In a 2 dm³ four-neck flask provided with reflux condenser, stirrer and inert gas blanketing (Ar), 114 g (1 mol) of $Mg(OC_2H_5)_2$ were suspended in 1 dm³ of diesel oil having a boiling range from 140 to 170° C. (hydrogenated petroleum fraction). 237 g (1.25 mol) of $TiCl_4$ were then added dropwise at 85° C. over a period of 5 hours. After an after-reaction time of 0.5 hour, the mixture was cooled to 60-70° C. and, after the solid had settled, 0.5 dm³ of the supernatant liquid phase (mother liquor) were taken off and 1.1 dm³ of fresh diesel oil (hydrogenated petroleum fraction having a boiling range from 140 to 170° C.) were subsequently added. After 1.1 dm³ of dispersion medium had been introduced a total of four times and in each case 1.1 dm³ of supernatant solution had been taken off again, 0.9 dm³ of diesel oil was introduced and the suspension was stirred at 120° C. for 18 hours.

The suspension was cooled to room temperature. The molar ratio of the solid was: Mg:Ti:Cl≈1:0.15:2.13.

The polymerization was carried out as described in Example 4, except that 120 mmol of triethylaluminum as cocatalyst (=catalyst component B) and subsequently the catalyst component A prepared as described in Comparative Example 3 in an amount corresponding to 6.0 mmol of titanium, as a suspension diluted with diesel oil, were introduced into the reactor. The molar aluminum/titanium ratio was thus 20:1.

The results of the polymerization are shown below in Table 2.

TABLE 2

Polymerization experiments in 200 dm³ reactor, 100 dm³ of diesel oil, polymerization temperature: 85° C., 50-55% by volume of $H_2$, Al/Ti = 20:1, 8 kg/h of ethylene feed gas, yield: 30 kg, polymerization time: 3.75 h

| Catalyst component A from | Ex. 4 | Ex. 5 | Ex. 6 | Comp. Ex. 3 |
|---|---|---|---|---|
| Catalyst component B in [mmol] | 60 | 60 | 60 | 60 |
| Catalyst component A in [mmol] of titanium | 3 | 3 | 3 | 6 |
| Final pressure in [bar] | 5.4 | 5.3 | 5.0 | 7.5 |
| Reduced catalyst time yield in [kg of PE/(mmol of Ti · bar · h)] | 0.49 | 0.50 | 0.53 | 0.18 |
| Bulk density in [g/dm³] | 380 | 365 | 345 | 420 |
| $d_{50}$ in [µm] | 199 | 200 | 214 | 153 |
| VN in [cm³/g] | 162 | 218 | 165 | 181 |
| $MFR_{5/190}$ in [g/10 min] | 12.9 | 4.9 | 15.2 | 10.0 |
| $FRR_{21.6/5}$ | 12.5 | 11.9 | 12.4 | 12.4 |
| $M_w$ in [g/mol] | $1.3 \cdot 10^5$ | $1.6 \cdot 10^5$ | $1.4 \cdot 10^5$ | $1.4 \cdot 10^5$ |
| $M_w/M_n$ | 8.1 | 7.0 | 8.5 | 7.3 |

It can clearly be seen from the values in Table 2 that polymers having a broad molar mass distribution can be prepared advantageously at significantly increased polymerization activities by the process of the invention.

The invention claimed is:

1. A process for preparing an olefin polymer by (co)polymerization of ethylene or ethylene with up to 10% by weight, based on the total amount of monomers, of a 1-olefin of formula $R—CH=CH_2$, wherein R is an unbranched or branched alkyl radical comprising from 1 to 12 carbon atoms, in suspension, in solution, or in gas phase at a temperature from 20 to 120° C., and a pressure from 0.2 to 6.0 MPa in presence of a catalyst comprising a reaction product of a magnesium alkoxide with a tetravalent transition metal compound, wherein a magnesium alkoxide of formula I $$Mg(OR^1)(OR^2) \quad (I),$$

wherein
$R^1$ and $R^2$ are identical or different, and are each an unbranched or branched alkyl radical comprising from 1 to 20 carbon atoms, or a radical $(CH_2)_nOR^3$;
$R^3$ is an alkyl radical comprising from 1 to 4 carbon atoms; and
n is an integer from 2 to 6;
is suspended or dispersed as gel in an inert solvent, and is reacted with a tetravalent transition metal compound of formula II $$M^1X_m(OR^4)_{4-m} \quad (II),$$

wherein
$M^1$ is titanium, zirconium or hafnium;
$R^4$ is an alkyl radical comprising from 1 to 9 carbon atoms;
X is a halogen atom; and
m is an integer from zero to 4;
at a temperature ranging from 20 to 140° C. in a molar ratio of Mg:$M^1$ of 1:0.05-10; the reaction product is then after-treated thermally at a temperature ranging from 90 to 200° C. for a period from 10 to 180 minutes, and wherein the catalyst provides in a single stage polymerization process producing a polymer comprising a medium to broad molar mass distribution, expressed as a $M_w/M_n$ greater than 6.9.

2. The process according to claim 1, wherein
$R^1$ and $R^2$ in formula (I) are identical or different, and are each an unbranched or branched alkyl radical comprising from 2 to 10 carbon atoms, or a radical —$(CH_2)_nOR^6$;
$R^6$ is a $C_1$-$C_2$-alkyl radical; and
n is an integer from 2 to 6.

3. The process according to claim 1, wherein the magnesium alkoxide of formula (I) is reacted with the tetravalent transition metal compound of formula (II) at a temperature from 20 to 140° C. over a period from 1 to 20 hours.

4. The process according to claim 1, wherein the inert solvent is selected from aliphatic and cycloaliphatic hydrocarbons, aromatic hydrocarbons and petroleum spirit and hydrogenated diesel oil fractions.

5. The process according to claim 1, wherein the magnesium alkoxide of formula (I), and the tetravalent transition metal compound of formula (II) are used in a molar ratio, wherein Mg:$M^1$ is 1:0.1-3.5.

6. The process according to claim 1, wherein the reaction product of the magnesium alkoxide with the tetravalent transition metal compound is in suspension, and is stirred at a temperature from 90 to 200° C. for from 20 to 180 minutes, with the magnesium alkoxide with the tetravalent transition metal compound in suspension then being washed until the supernatant mother liquor comprises X and $M^1$ concentrations of less than 10 mmol/l.

7. The process according to claim 6, wherein the temperature is from 100 to 140° C.

8. The process according to claim 6, wherein the reaction product of the magnesium alkoxide with the tetravalent transition metal compound is in suspension, and is stirred for 30 to 90 minutes.

9. The process according to claim 1, wherein a trialkylaluminum comprising from 1 to 6 carbon atoms in the alkyl radicals is used as a cocatalyst.

10. The process according to claim 9, wherein the trialkylaluminum is chosen from triethylaluminum, triisobutylaluminum, or triisohexylaluminum.

11. The process according to claim 9, wherein the trialkylaluminum is chosen from a reaction product of a trialkylaluminum or dialkylaluminum hydride with isoprene.

12. The process according to claim 11, wherein the trialkylaluminum is chosen from triethylaluminum or triisobutylaluminum.

13. The process according to claim 4, wherein the aliphatic and cycloaliphatic hydrocarbons are selected from butane, pentane, hexane, heptane, cyclohexane, and isooctane.

14. The process according to claim 4, wherein the aromatic hydrocarbons are selected from benzene and xylene.

\* \* \* \* \*